INVENTORS:
EVAN F. BINKERD
ROBERT B. RENDEK

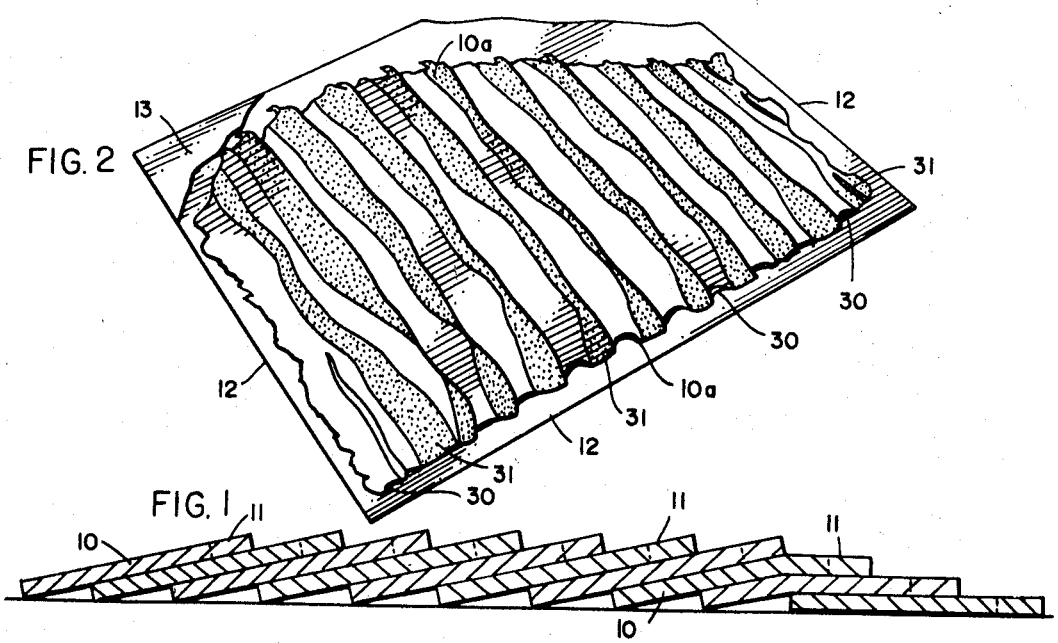
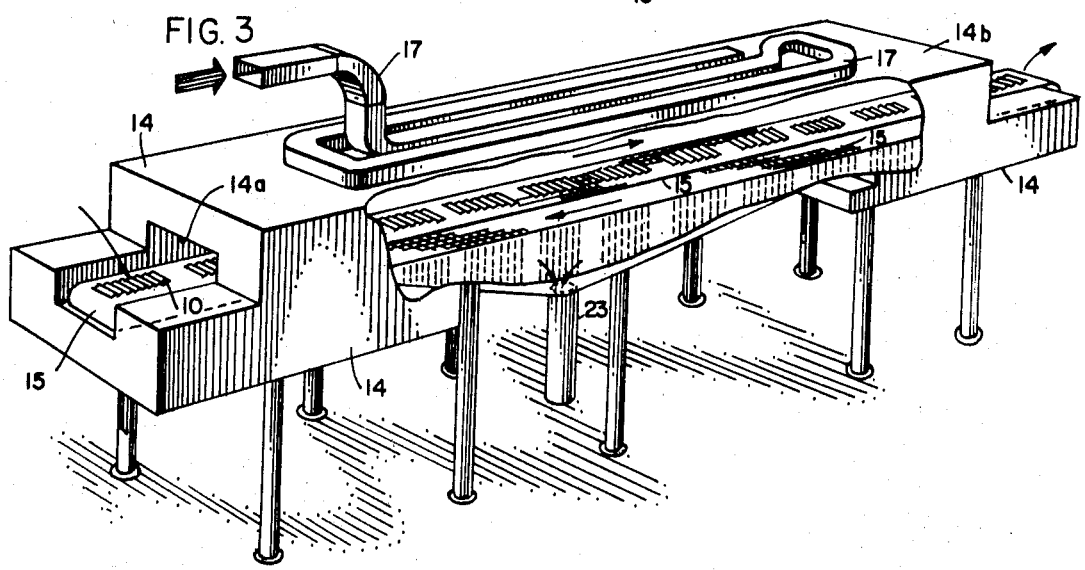
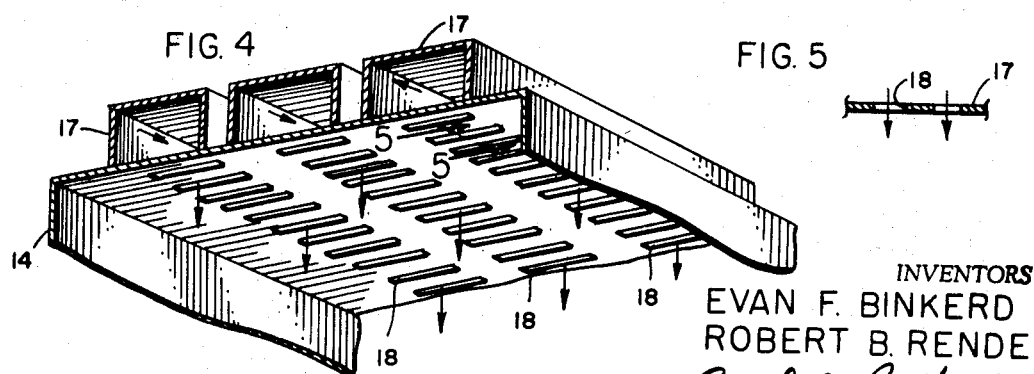
INVENTORS:
EVAN F. BINKERD
ROBERT B. RENDEK
Carl C. Batz
ATT'Y Oct. 6, 1970    E. F. BINKERD ET AL    3,532,511
PROCESS FOR COOKING SHINGLED BACON SLICES
Filed Nov. 29, 1968                                        4 Sheets-Sheet 2

Carl C Batz
ATT'

Oct. 6, 1970  E. F. BINKERD ET AL  3,532,511
PROCESS FOR COOKING SHINGLED BACON SLICES
Filed Nov. 29, 1968  4 Sheets-Sheet 3

INVENTORS:
EVAN F. BINKERD
ROBERT B. RENDEK
Carl C. Batz
ATT'Y

Oct. 6, 1970   E. F. BINKERD ET AL   3,532,511
PROCESS FOR COOKING SHINGLED BACON SLICES
Filed Nov. 29, 1968   4 Sheets-Sheet 4

INVENTORS:
EVAN F. BINKERD
ROBERT B. RENDEK
BY: *Carl C. Batz*
ATT'Y

United States Patent Office 3,532,511
Patented Oct. 6, 1970

3,532,511
PROCESS FOR COOKING SHINGLED BACON SLICES
Evan F. Binkerd, Downers Grove, and Robert B. Rendek, Hillside, Ill., assignors to Armour and Company, Chicago, Ill., a corporation of Delaware
Continuation-in-part of application Ser. No. 492,736, Oct. 4, 1965. This application Nov. 29, 1968, Ser. No. 779,683
Int. Cl. B65b 25/06
U.S. Cl. 99—107                                10 Claims

ABSTRACT OF THE DISCLOSURE

Raw slices of bacon are arranged in edge-overlapping shingled relation and the draft of slices so arranged subjected to microwave energy at a level for cooking the slices, the fat edge portions of the slices curling to form spaced ribs in the draft of cooked slices.

RELATED CASE

This application is a continuation-in-part of copending application Ser. No. 492,736 filed Oct. 4, 1965 now abandoned.

BACKGROUND AND SUMMARY

This invention relates to shingled cooked bacon, and more particularly to the preparation of cooked bacon slices arranged in edge-overlapping draft relation and to the packaged product.

It is common practice to arrange raw bacon slices in edge-overlapping draft relation, which is generally referred to as "shingled" relation. Such a package arrangement is generally required because the overlapping arrangement enables the housewife to remove the slices one by one without disturbing the remaining slices, and also the overlapping arrangement of the slices in the package enables the housewife to see the quality of the slices and the presence of substantial lean portions in the slices. There is a large demand at the present time for cooked bacon slices because such processing enables the user to avoid the fat-rendering cooking operations, and such product is packaged for sale as "precooked bacon." Since the bacon slices during the cooking stage tend to curl and the fat portions become crisp, it is impracticable to attempt to package them in the desired shingled relation. Even when the slices are separately cooked, the uneven and irregular curvature of the slices after cooking make it practically impossible to nest them in an orderly shingled relation, while at the same time such handling brings about breakage of the delicate crisp fat portions of the bacon.

We have discovered that bacon slices can be packaged in a shingled relation and cooked in situ in a manner which frees the raw bacon slices of their fat while the cooked slices remain in a nested, orderly, overlapping relation and are, in fact, maintained in the desired relation by the curled fat edge portions of the slices. By subjecting the raw bacon slices in overlapping draft relation to microwave energy, the slices can be cooked uniformly, the fat drained therefrom, and the nested slices then packaged, with the slices in their overlapping relation so that they may be removed one at at time without disturbing the remaining slices in the pack.

A primary object, therefore, of the invention is to provide a process for the cooking of bacon slices in edge-overlapping or shingled relation. A further object is to provide cooked bacon slices in nested shingled relation and with curled fat portions which aid in the separation of the slices. Yet another object is to cook with microwave energy bacon slices in edge-overlapping relation while draining fat from the cooked slices. Other specific objects and advantages will appear as the specification proceeds.

DRAWINGS

Figure 6:
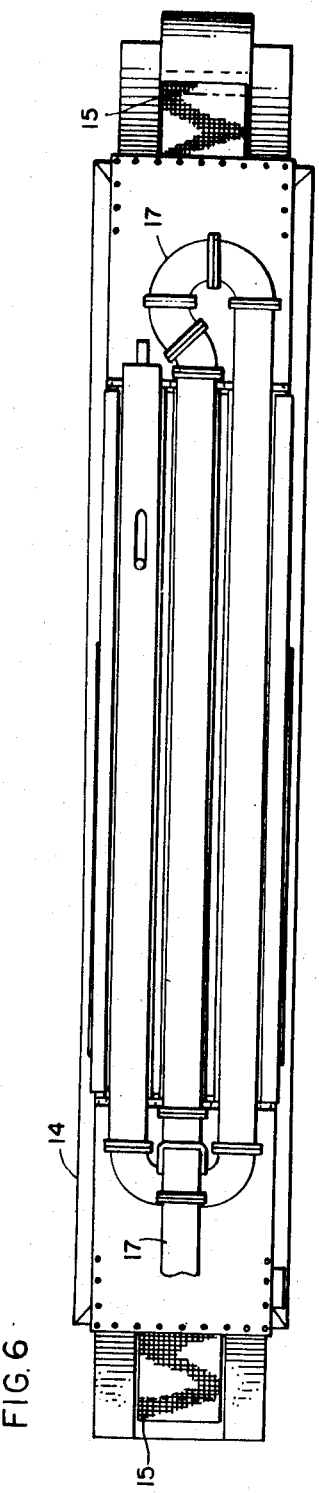
Figure 7:
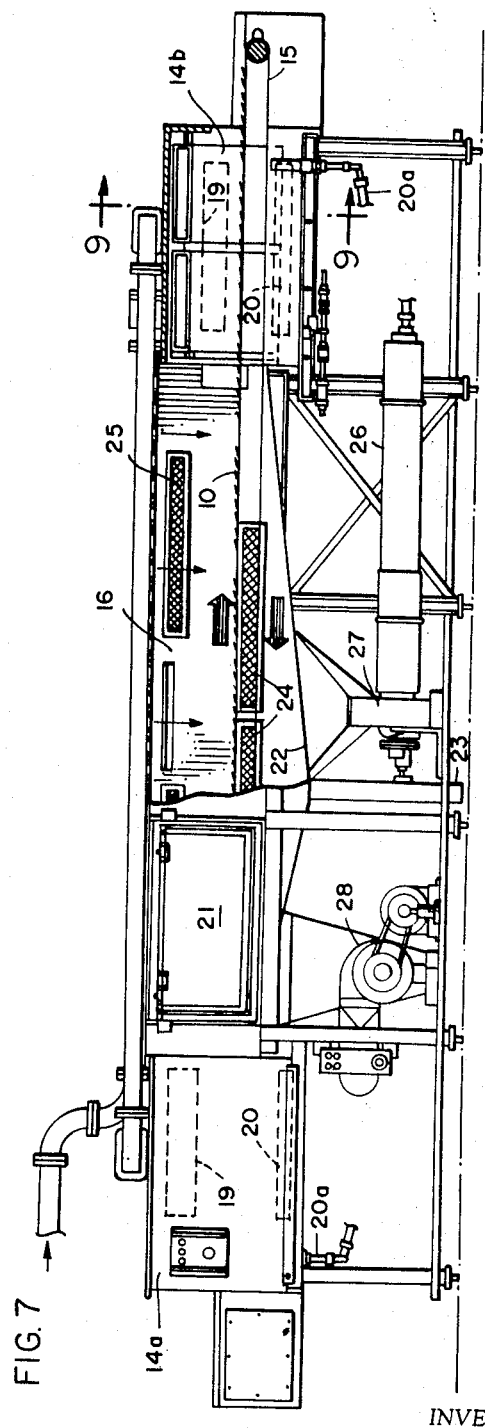
Figure 10:
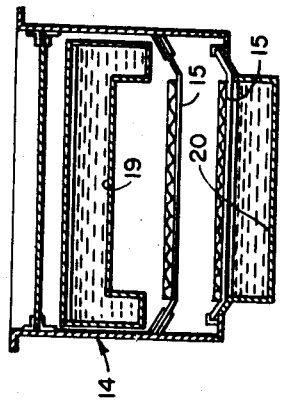
Figure 9:
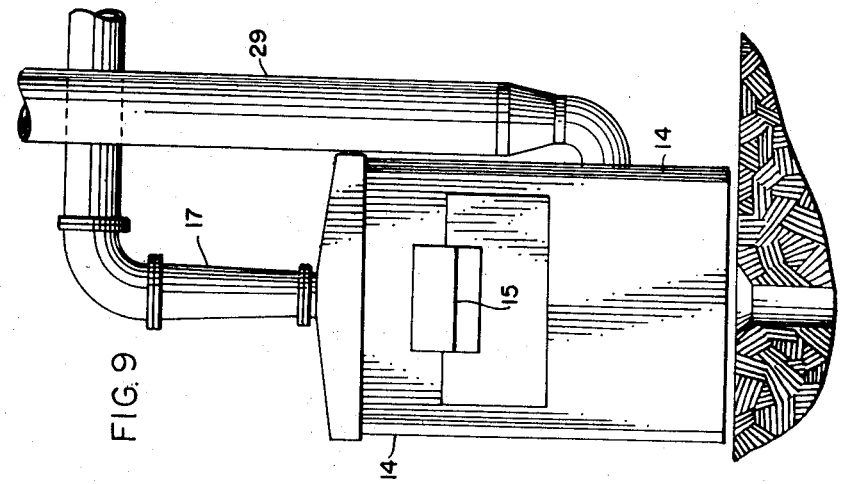
Figure 8:
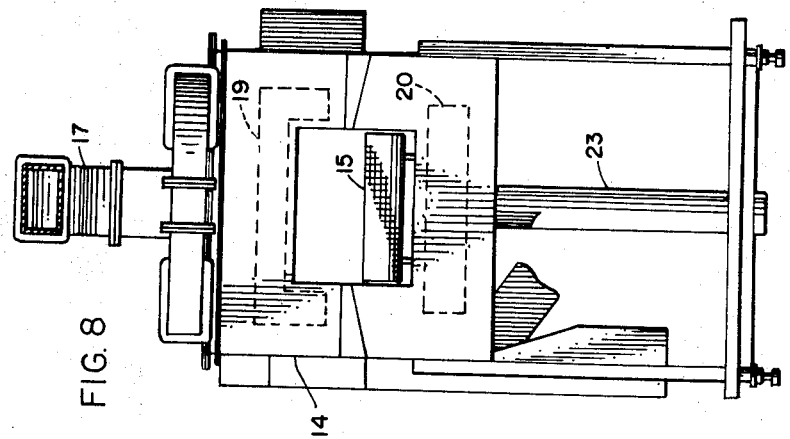
Figure 13:
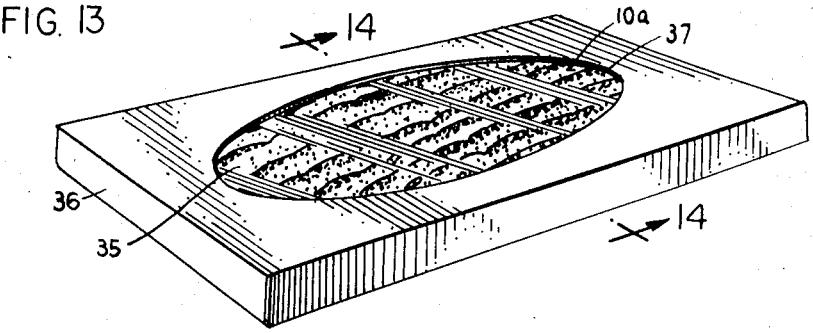
Figure 11:
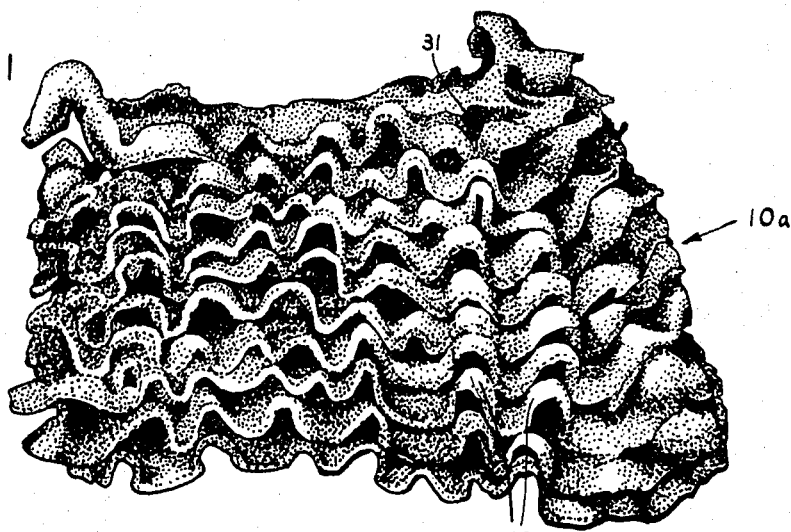
Figure 12:
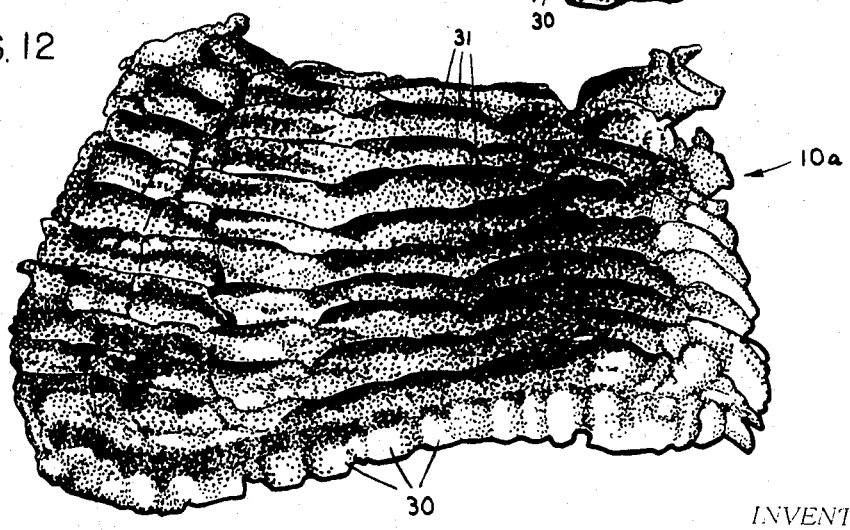

The invention is shown in illustrative embodiments by the accompanying drawings, in which:

FIG. 1 is a sectional view of a draft or stack of raw bacon slices arranged in edge-overlapping relation; FIG. 2, a perspective view of cooked bacon slices arranged in shingled relation in a package; FIG. 3, a broken perspective view of apparatus for cooking the bacon slice drafts in edge-overlapping relation; FIG. 4, an enlarged broken perspective view showing the slots through which microwave energy is directed onto the bacon slices; FIG. 5, a detail sectional view, the section being taken as indicated at line 5—5 of FIG. 4; FIG. 6, a top plan view of the microwave-applying apparatus; FIG. 7, a broken side view in elevation of the structure shown in FIG. 6; FIG. 8, a front view in elevation of the apparatus shown in FIG. 6; 9, an end view on a reduced scale of the microwave-applying apparatus and showing the exhaust duct communicating with the apparatus; FIG. 10, a detail sectional view, the section being taken as indicated at line 9—9 of FIG. 7; FIG. 11, a stippled drawing in plan view of cooked shingled bacon slices similar to those shown in FIG. 2, except showing the fat side up; FIG. 12, a stippled drawing in plan view of cooked shingled bacon slices as shown in FIG. 11 but reversed to show the lean side up; FIG. 13, a perspective view of a modified package having a window through which the cooked bacon is visible; and FIG. 14, a sectional view taken along line 14—14 of FIG. 13.

DETAILED DESCRIPTION

In the illustration given, 10 designates bacon slices which are arranged in edge-overlapping relation, as shown best in FIG. 1. In FIG. 1, the slices are raw slices and the slices are arranged with their fat edge portion 11 uppermost. After the bacon slices are subjected to microwave energy sufficiently to cook the slices and after the rendered fat is removed, the finished or cooked slices 10a are shown in FIG. 2 arranged on a support board 12 and preferably enclosed with a cellophane or other transparent wrapper 13. It will be understood that the cooked bacon slices may be packaged in any suitable manner in boxes or on boards enclosed with transparent wrappers, etc.

FIG. 11 shows the same type of cooked bacon draft as shown with the packaged material in FIG. 2, but reversed to show the fat side of the draft. As is apparent, particularly from this FIG. 11, the fatty edges curl and so separate from the pieces therebelow. The curls line up in places to form ridges 30. The lean side of the draft, as more particularly shown in FIG. 12, tends to be more flat so that the lean portions of the bacon line up more or less as an overall flat surface.

The cooking with microwave energy may be accomplished in any suitable apparatus and in any suitable manner. The range of microwave frequency is 400–20,000 megacycles/second, and the energy levels may vary from 8–25 kilowatts and higher, depending on the desired cooking time, the character of the slices being cooked, etc.

Apparatus suitable for cooking the bacon through the use of microwave energy is shown in FIGS. 3-10, inclusive. In such apparatus, there is provided a casing 14 formed of a highly conductive material, such as aluminum or copper, and in the casing is mounted a continuous mesh conveyor 15. The conveyor is preferably formed of Teflon-coated fiberglass, and the mesh is 4 x 5 mesh; that is, four openings per inch in one direction and five openings per inch in the opposite direction. The conveyor or belt 15 may be formed of any electrically nonconductive material, such as various well known pastics or treated fabrics. The driven conveyor 15 carries the bacon slices 10 through the cooking chamber 16 in the central portion of the casing 14 and with the slices arranged in shingled relation, as shown in FIG. 1.

Microwave energy is delivered through a waveguide duct 17 of metal and the guide 17 traverses the top of the metal casing 14, the guide portions over the chamber 16 being provided with transverse slots 18 in their bottoms so that the microwave energy is delivered downwardly through the bacon on conveyor 15, as shown best in FIG. 7.

At the ends of the casing in entrance tunnel 14a and exit tunnel 14b, suitable bodies of water or other lossy material are held within containers 19 and 20 so as to absorb the microwave energy reaching the ends of the casing. Such containers for the lossy material are shown best in FIG. 10. A liquid is circulated to and from the containers through pipes 20a. The upper container 19 has at least its bottom portion formed of a dielectric material, such as plastic, glass, ceramic, or the like, which is transparent to microwave energy. Container 20 may be an open container filled with water or other lossy material. If desired, the casing 14 may be provided along one side of the cooking chamber 16, with a hinged conductive metal door 21 providing access to the cooking chamber.

The cooking chamber is provided with a downwardly inclined drain or bottom portion 22 communicating at its lower point with a drainage pipe 23 for collecting the fat generated during the cooking of the bacon slices. In order to carry away vapors which are also generated during the cooking operation, air or other suitable gas is passed into the chamber through the inlet ducts 24, and the air may be exhausted through outlet ducts 25. The air may range in temperature from ambient to around 230° F., but we prefer to employ an air temperature of about 80-190° F. In the illustrative apparatus shown, air is heated in the gas combustion heater 26 and forced by fan 27 through the inlets in the chamber 16. Exhaust air is removed from the chamber by the motor-driven fan 28 through exhaust duct 29.

In the operation of the apparatus, the shingled bacon slices 10 are arranged in spaced relation on the conveyor 15 and travel first through the entrance tunnel 14a and then through the cooking chamber 16 where they are subjected to the microwave energy. The metal walls of the casing prevent the escape of microwave energy. At the entrance and exit tunnels 14a and 14b adjoining the cooking chamber, the bodies of liquid glossy material in containers 19 and 20 prevent the escape of such energy from the apparatus. The speed of the conveyor and the microwave energy levels are coordinated to provide for the cooking of the bacon. The rendered fat is carried away by the inclined bottom 22 to the drain pipe 23. The current of air supplied by the fans carries away evolved vapors, and such air may be heated to temperatures varying from ambient to about 230° F. or higher, as hereinbefore stated. Generally, an air temperature from 80° to 190° F. is preferred.

The microwave energy may be varied widely in the range of 400-20,000 megacycles/second, but we prefer to employ a microwave oven operating at a frequency of about 900 megacycles and having a capacity or energy level of 25 kilowatts or higher.

By way of example, when employing a microwave oven operating at a frequency of 915 megacycles, we find that the cooking times range from about 1.5 to 2.0 minutes and the microwave energy level is from 9 to 20 kilowatts for an approximate 60 percent cooking shrink. This is an approximate range of 8 to 10 pounds per kilowatt hour.

We prefer to cook the bacon to a state where it is edible but not to the point where it is brittle, which would be a preferred range of about 40 to 70 percent shrink or, expressed in another way, resulting in a cooked bacon product of about 30 to 60 percent of its raw weight.

In the slicing operation, the bacon slab to be sliced may be fed with its lean side up to a slicing machine for forming the slices in drafts and preferably drafts of slices in overlapping (shingled) relation. The shingled draft may then be turned over and placed upon the conveyor 15 with the fat edge portions of the slices uppermost, as shown in FIG. 1.

During the cooking (precooking stage), the fat edges 11 of the slices curl and form, in effect, ribs 30 extending transversely of the slices and in spaced relation. Such curling minimizes the contact between slices and allows easier separation of the slices after subsequent chilling and packaging. Further, the lean side of the slice 31 tends to stay more nearly flat, and such lean portions 31 lie in nested relation between the curved rib portions 30.

The resulting bacon packages consists of the cooked slices which lie in orderly relation, with their edges overlapping and with the curved and curled fat portions 30 forming spaced ribs throughout the draft. As a result, the cooked slices may be removed one at a time from the packaged as desired without disturbing the remaining slices, while at the same time the package unity is maintained by the spaced curled rib portions 30.

As the precooked bacon leaves the cooking chamber, we prefer to employ air jets (not shown) of moderate velocity for blowing off excess rendered fat, and the shingle of bacon is then chilled, as, for example, by passing it through a blast chill tunnel which lowers the temperature preferably to about 40-50° F. After chilling, a waxed board or parchment paper 12 may be placed either mechanically or manually over the precooked draft of bacon, and the board may be turned to hold the precooked bacon and board so that the bacon is uppermost and the bacon slices are reversed, with the fat edge portion of each slice on the lower side of the draft. For example, the draft of bacon with the board thereon may be passed through a dual conveyor mechanism (not shown), which conveyor holds the precooked bacon and board while a 180° radius is traversed. This "rights" the draft of bacon and allows it to be conveyed on standard conveyors to inspection and weighing stations prior to packaging. Since such apparatus is well known, a further description is believed unnecessary. If desired, such inversion may be done manually. After making the inversion as described, the cooked slices are arranged, as shown in FIG. 2, with the board 12 therebelow, and a transparent wrapper 13 may then be wrapped about the package and sealed to provide a complete package of the bacon sliced in shingled arrangement.

The microwave energy injected into chamber 16 is repeatedly reflected between the conducting walls of the housing 14 and is substantially absorbed in the meat. A minor portion of the energy may propagate toward the exit and entrance channels where it is attenuated by the lossy material in containers 19 and 20. The energy passes repeatedly through the bacon product and a portion of the energy is absorbed with each passage and appears as heat within the bacon. The unabsorbed energy reaching the entrance and exit portions of the casing must pass repeatedly through the lossy liquid in containers 19 and 20 so that it is substantially attenuated before reaching the open ends of the casing.

Specific examples illustrative of the invention may be set out as follows.

EXAMPLE I

Shingled bacon slices having a 5/8 inch separation between the top edges of the fat portion of the slices were exposed to microwaves having an approximate energy level of 23 kilowatts for 1½ minutes of dwell time. Simultaneously, air heated to an approximate temperature of 190° F. was moved continuously through the oven across the exposed bacon slices. This resulted in a cook shrink of 58.3 percent. The cooked bacon was subjected to air jets for blowing off excess rendered fat and then passed through a chill tunnel to lower the temperature to approximately 40° F. A waxed board was then placed on the bacon slices and the board inverted and wrapped to provide a package, as shown in FIG. 2. In such finished product, the fat portions of the slices formed curled rib portions at spaced distances while the lean portions lay therebetween in relatively flat and in nested relation.

EXAMPLE II

Shingled bacon slices having a ¾ inch separation between the top edges of the fat portion (14 slices per draft) were exposed to microwaves having a frequency of 915 megacycles and having an energy level of 18 kilowatts for a period of two minutes. Hot air heated to a temperature of 160° F. was moved through the oven cavity and over the surface of the bacon strips. This produced a cook shrink of 64.7 percent. The product was as described in Example I.

EXAMPLE III

Shingled bacon slices placed 5/8 inch apart as measured at the top edges of the fat portion and with 16 slices per draft were exposed to microwaves (915 megacycles) having an energy level of 20 kilowatts for a period of two minutes. Heated air having a temperature of 160° F. was moved through the cooking chamber and over the surface of the bacon slices. This resulted in a cook shrink of 56.7 percent.

The desired ratio of moisture to salt is 5:11 or less in the finished product. Such a ratio is desired because the bacon can then be packaged under vacuum and the product does not require refrigeration. Even when packed in a conventional carton employed in packaging bacon slices, it is found that no mold growth is encountered where the product has a moisture-to-salt ratio of 5:1 or less.

In the product produced by the above described process, the slices are cooked thoroughly even though they are arranged in overlapping relation, and there is no overcooking of the surface areas. Further, by employing microwave energy, there is no overcooking of the fat because the fat has a lower dielectric loss factor and less energy is absorbed. The lean meat preferentially absorbs more energy and therefore is completely cooked, while the fat portion which receives less energy is not overcooked and does not become too brittle for effective packaging.

Figure 14:

As illustrated in FIGS. 13 and 14, the cooked draft of bacon may be enclosed in a transparent wrapper 35 which may be a polyethylene sheet and the draft so enclosed placed in a carton 36 having on its top side a window 37. Desirably the lean side of the draft should be placed upwardly next to the window with the curled fatty side facing downwardly against the opposite side of the carton. The bottom sides of the carton contact the ridges 30 of the bacon curls and so hold the curls in place within the package without disturbing their function of making the slices easier to separate by hand.

While in the foregoing specification we have set out process steps and procedure in considerable detail for the purpose of illustrating embodiments of the invention, it will be understood that such details may be varied widely by those skilled in the art without departing from the spirit of our invention.

We claim:

1. In a process for cooking bacon slices for packaging, the steps of arranging raw slices of bacon in edge-overlapping draft relation with the fat edges thereof free to curl during cooking, and subjecting the draft to microwave energy at a level for cooking the bacon slices whereby the fat edges curl thus minimizing the contact between the slices and allowing easier separation of the slices after subsequent chilling and packaging.

2. In a process for precooking bacon slices, the steps of arranging raw bacon slices in edge-overlapping draft relation with the fat edges thereof free to curl during cooking, subjecting the draft to microwave energy at a level for cooking the bacon slices whereby the fat edges curl thus minimizing the contact between the slices and allowing easier separation of the slices after subsequent chilling and packaging and wrapping the cooked slices in such relation.

3. In a process for cooking bacon slices for packaging, the steps of arranging raw bacon slices in edge-overlapping draft relation with the fat edges of the bacon slices uppermost and free to curl during cooking, subjecting the draft to microwave energy at a level for cooking the bacon slices while in overlapped relation whereby the fat edges curl thus minimizing the contact between the slices and allowing easier separation of the slices after subsequent chilling and packaging, and inverting the draft upon a package board for packaging.

4. In a process for cooking bacon slices for packaging, the steps of arranging raw bacon slices in overlapping draft relation with the fat edges thereof free to curl during cooking, subjecting the draft of slices to microwave energy at a level for rendering fat therefrom whereby the fat edges curl thus minimizing the contact between the slices and allowing easier separation of the slices after subsequent chilling and packaging, and withdrawing said rendered fat.

5. The process of claim 4 in which air jets are impinged upon the cooked bacon slices to remove excess rendered fat therefrom.

6. In a process for cooking bacon slices in shingled arrangement, the steps of arranging raw bacon slices in shingled relation with the fat edges thereof free to curl during cooking, subjecting the slices while so arranged to microwave energy at a level for cooking the bacon slices whereby the fat edges curl thus minimizing the contact between the slices and allowing easier separation of the slices after subsequent chilling and packaging, chilling the bacon slices while in said relation, and packaging the chilled shingled bacon.

7. In a process for cooking bacon slices, the step of passing bacon slices in shingled relation through a cooking zone containing microwave energy with the fat edges of the slices free to curl during cooking whereby under said energy said fat edges curl thus minimizing the contact between the slices and allowing easier separation of the slices after subsequent chilling and packaging.

8. In the preparation of cooked bacon slices for packaging, the steps of turning a draft of shingled bacon slices received from a slicing system to bring the fat edge portions of the slices uppermost and free to curl during cooking, and passing the draft of slices so arranged through a confined cooking zone containing microwave energy whereby said fat edges curl thus minimizing the contact between the slices and allowing easier separation of the slices after subsequent chilling and packaging.

9. In the preparation of a package of cooked bacon slices, the process of cooking a draft of raw bacon slices in edge-overlapping relation with the fat edges thereof free to curl by subjecting said draft to microwave energy at a level whereby the fatty edges of said slices are curled thus minimizing the contact between the slices and allowing easier separation of the slices after subsequent chilling and packaging, and placing said cooked draft of bacon into a carton having a window on one side thereof with the lean side of the draft facing said window and the fatty side facing downwardly with the curls so formed in contact with a side of said carton.

10. A product prepared by the method of claim 1.

References Cited

UNITED STATES PATENTS

| | | | |
|---|---|---|---|
| 1,711,372 | 4/1929 | Carter | 99—174 |
| 2,807,550 | 9/1957 | Zarotschenzeff et al. | 99—174 |
| 2,980,541 | 4/1961 | Mac Donald | 99—174 |
| 3,230,860 | 1/1966 | Barrett et al. | |
| 3,321,314 | 5/1967 | Jeppson | 99—107 |

HYMAN LORD, Primary Examiner

U.S. Cl. X.R.

99—174

PO-1050
(5/69)

UNITED STATES PATENT OFFICE
CERTIFICATE OF CORRECTION

Patent No. __3,532,511__    Dated __October 6, 1970__

Inventor(s) __Evan F. Binkerd and Robert B. Rendek__

It is certified that error appears in the above-identified patent and that said Letters Patent are hereby corrected as shown below:

In column 3, line 10, "pastics" should be changed to -- plastics --; and line 59, "glossy" should be changed to -- lossy --.

In column 4, line 29, please change "packages" to -- package --.

In column 5, line 41, "5:11" should be changed to -- 5:1 --.

SIGNED AND SEALED
DEC 1 - 1970

(SEAL)
Attest:

Edward M. Fletcher, Jr.
Attesting Officer

WILLIAM E. SCHUYLER, JR.
Commissioner of Patents